Dec. 7, 1937.  A. A. WARNER  2,101,324
SEAL FOR PERCOLATORS
Filed Feb. 3, 1936
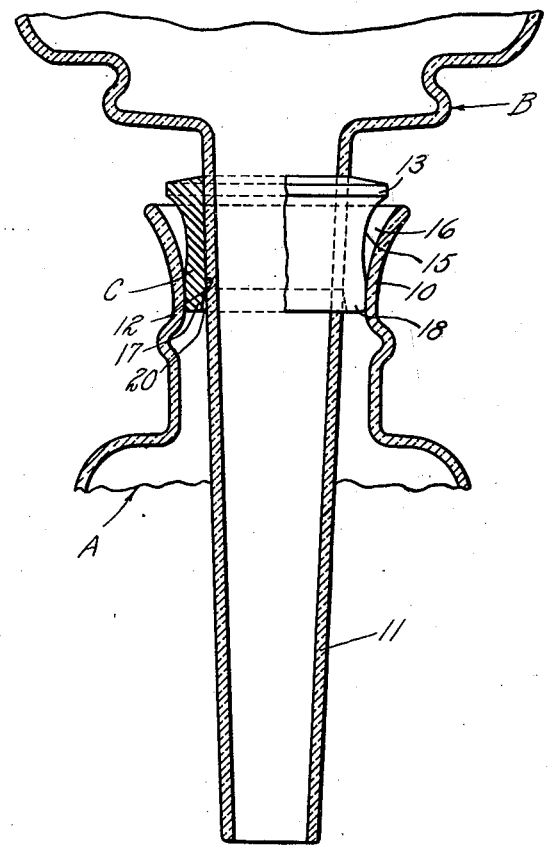
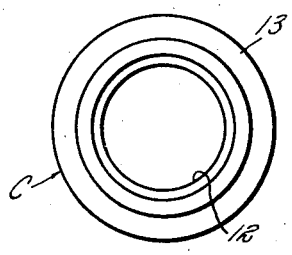
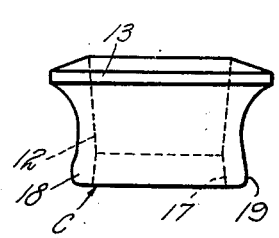
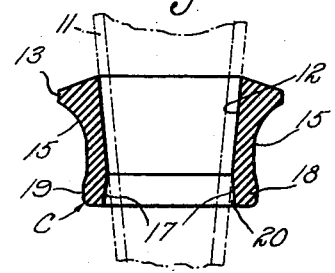
Inventor
ALONZO A. WARNER
By N. Clay Lindsey.
Attorney Patented Dec. 7, 1937

2,101,324

UNITED STATES PATENT OFFICE 2,101,324

SEAL FOR PERCOLATORS

Alonzo A. Warner, New Britain, Conn., assignor to Landers, Frary & Clark, New Britain, Conn., a corporation of Connecticut Application February 8, 1936, Serial No. 62,914

5 Claims. (Cl. 53—3)

This invention relates broadly to the art of coffee percolators and is more particularly concerned with a percolator having a lower heating vessel provided with a neck, an upper vessel having a depending tube or spout extending through the neck and into the lower vessel, and a packing between the tube and the neck in order to form a good seal therebetween and thus permit the steam created in the kettle to force the water up through the tube or spout and into the upper receptacle in which the coffee material is supported on a strainer or the like.

The aim of this invention is to provide for percolators of this type, an improved deformable sealing member which may be easily positioned in and removed from the neck of the lower receptacle, which will snugly fit in the neck and form a secure seal between the tube and the neck, and which, when properly positioned about the tube and within the neck will automatically and resiliently hold itself in place against dislodgment.

In the manufacture of percolator vessels, particularly when made of glass, as is common practice in this art, it is difficult to shape the vessels to close dimensions and the necks and tubes of uniform roundness. With my improved arrangement, the above advantages are obtained and slight variations in dimensions of roundness are automatically compensated for.

Other objects will be in part obvious and in part indicated hereinafter and more in detail.

The invention accordingly consists in the unique construction and the combination of members hereinafter fully described, illustrated in the accompanying drawings and referred to in the claims appended hereto; it being understood, of course, that various changes in the general form, proportion, and size, as well as minor details of construction lying within the scope of the claims may be resorted to without departing from the scope of the invention or sacrificing any of the advantages thereof.

In the accompanying drawing, wherein is shown for illustrative purposes one embodiment which the present invention may take:

Figure 1 is a sectional fragmentary view of a percolator illustrating the application of the present invention;

Fig. 2 is a bottom plan view of the sealing member;

Fig. 3 is a side elevational view thereof; and

Fig. 4 is a transverse sectional view therethrough.

Referring to the drawing, A denotes a lower vessel preferably in the form of a glass bulb and having a substantially bell-mouthed neck 10 which is tapered, the inner wall of the mouth being preferably convexly curved, as illustrated. The letter B designates an upper vessel also preferably formed of glass and having a bulb provided with a depending tube or spout 11 extending through the neck 10 and into the vessel A. This tube, in the present instance, tapers down in diameter towards its lower end, but, if desired, it may be provided with a uniform diameter throughout its length. The letter C designates my improved packing or sealing member surrounding the tube adjacent its upper end and deformably and resiliently fitting in the mouth of the neck, thereby forming an effective but easily removable seal.

The sealing member C is in the form of a collar or tubular sleeve formed of a readily yieldable material such, for example, as soft rubber. It has an axial opening 12 which, in the present instance, is somewhat tapered to conform with and snugly receive the tube 11 adjacent its upper end. The collar has a generally tubular body portion provided at its upper end with an encircling flange 13. The under surface 15 of flange 13 is preferably convexly curved so that, when the seal is in place, it may seat within the convexly curved outer end of the mouth of the neck 10, and a portion of surface 15 may conform to the inner face of the neck, leaving a space 16 within which the seal may expand or contract dependent upon variations in contour of neck 10. The lower end of the sleeve is internally bevelled or enlarged, as at 17, so as to provide an annular skirt or lip 18 which is of somewhat larger internal diameter than that portion of the tube 11 which it surrounds. Also, by preference, the skirt is provided with an external bead 19 which is of somewhat larger diameter than the intermediate body portion of the sleeve adjacent thereto. The external diameter of the skirt, particularly adjacent the lower end of the skirt, is normally of larger diameter than that portion of the neck in which it fits when the sealing member is pushed home into the neck. In the present illustrative disclosure, the external surface of the intermediate or body portion of the sleeve is convex, the same merging at its upper end into the surface 15 and at its lower end into the bead 19, but the convexity of the body portion is not essential.

When in use, my improved seal is positioned about and forced up onto the tube 11 in close conformity and into resilient embracing relation therewith. Due to the bevelled portion 17, a space 20 is provided between the lip 18 and the tube. The collar is now positioned in the mouth and forced downwardly. When this is done, the bevelled surface 17 will be pressed inwardly towards the tube 11, diminishing space 20, and the external surface of lip 18 will exactly conform with the tapered mouth 10. As the lip is composed of a relatively pliant and yieldable material, such as soft rubber, it will readily conform to the shape of the mouth, and it will expand outwardly against the internal surface of the mouth so as to form a very effective seal. The seal may be easily moved to final position within the neck and readily removed therefrom. Although the neck or the tube may be out of round, the spaces 16 and 20 will permit the seal to deform so that the lip will resiliently and tightly press against the neck throughout its entire circumference and the upper vessel will not tilt or rock.

I claim as my invention:

1. A seal for a coffee maker comprising a resiliently deformable sleeve arranged to be received in the tubular neck of a vessel, said sleeve having a central opening therethrough and adapted to snugly receive a tube depending from an upper vessel, and a laterally projecting annular lip on the lower end of said sleeve having an outer peripheral face adapted to deformably seat substantially throughout its entire extent in said neck, said lip having an internal diameter normally larger than the portion of the tube which it surrounds and an external diameter larger than that portion of the neck within which it is received.

2. A seal for a coffee maker comprising a resiliently deformable sleeve arranged to fit within the bell-mouthed neck of the vessel, an external curved face on the sleeve and having a larger diameter at its upper end, a central sleeve hole coaxial with the external face, and an annular laterally projecting lip at the bottom of the sleeve having an internal conical tapering face of normally larger diameter than the portion of the tube which it surrounds and arranged to be urged towards said tube portion by engagement of said lip with the neck when the seal is seated within said bell mouth.

3. A seal for a coffee maker comprising a resiliently deformable sleeve arranged to seat within the bell mouth of a vessel, and having an axial opening therethrough provided with an inner peripheral wall adapted to tightly engage the downwardly depending tube of an upper vessel, said seal having an upper flanged end and a tapering outer wall substantially circular in cross section, the bottom of said sleeve terminating in a radially projecting annular lip having an inner peripheral face merging into said inner peripheral wall and of greater diameter than that portion of the tube which it surrounds.

4. In a coffee maker, the combination with a lower vessel having an upstanding bell-mouthed neck and an upper vessel having a depending tube extending through said neck and into said lower vessel, of a fluid sealing member comprising a resiliently deformable tubular body embracing a portion of the depending tube and having a convexly curved outer face seated in said bell-mouthed neck, a flange at the top of said member and an annular lip integrally formed with and radially protruding from the lower end thereof, said lip having a longitudinally curved annular peripheral contour the outer face of which merges into said convexly curved outer face and a conical inner face which normally tapers outwardly from that portion of the tube which it surrounds.

5. A seal for a coffee maker comprising a deformable sleeve adapted to be positioned in the neck of a vessel and having an axial opening adapted to snugly receive a tube of an upper vessel, said sleeve having at its lower end a radially projecting annular lip normally of larger external diameter than the portion of the neck within which it is received, said lip deforming throughout its periphery into sealing engagement with said neck and having a tapering internal opening generally of larger diameter than that portion of the tube received therein.

ALONZO A. WARNER.